United States Patent Office 3,119,838
Patented Jan. 28, 1964

3,119,838
PREPARATION OF p-DITHIANE AND DIETHYL SULFIDE
Paul F. Warner, Phillips, and Clarence E. Lambert, Clute, Tex., assignors to Phillips Petroleum Company, a corporation of Delaware
No Drawing. Filed Dec. 13, 1960, Ser. No. 75,484
8 Claims. (Cl. 260—327)

This invention relates to the synthesis of p-dithiane. It also relates to the synthesis of diethylsulfide. In one of its aspects, the invention relates to the formation of p-dithiane (diethylene disulfide) by causing to interact, ethyl mercaptan and ethylene oxide in the presence of sodium hydroxide in methanol as catalyst. In another of its aspects, the invention relates to the formation of diethylsulfide by reaction of ethyl mercaptan and ethylene oxide in the presence of sodium hydroxide in methanol as catalyst.

We have now discovered that when mercaptan-ethylene oxide condensation products are sought to be prepared employing sodium hydroxide in methanol as catalyst, according to the following equation:

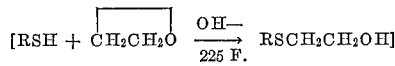

that the reaction goes smoothly and without problems to yield an alcohol and as many as 11 moles of ethylene oxide have been condensed with one mol of Sulfole [1] (dodecyl mercaptan). However, when an attempt was made to prepare 2-ethylmercapto ethanol by the method which had been used, according to the equation above set out, it was found that the reaction products were not at all the same as had been anticipated. Instead, the major product recovered in a yield of 40 to 50 percent has now been identified as p-dithiane having a total sulfur of 53.7 percent and a molecular weight of 119.5, a melting point of 227 to 230° F., and mercaptan sulfur equal to 0. Another major product found in the reaction mass has been identified as diethyl sulfide.

It is an object of this invention to provide a method for the synthesis of p-dithiane. It is another object of this invention to provide a method for the synthesis of diethyl sulfide. It is a further object of this invention to provide a manner of interacting ethyl mercaptan and ethylene oxide to yield p-dithane. It is a further object of this invention to provide a method for interacting

[1] A trademark.

ethyl mercaptan and ethylene oxide to produce diethyl sulfide. It is a still further object of this invention to provide a catalyst which will cause the conversion of ethyl mercaptan and ethylene oxide to p-dithiane. It is a still further object of this invention to provide a catalyst which will cause the conversion of ethyl mercaptan and ethylene oxide to diethyl sulfide.

Other aspects, objects and several advantages of this invention are apparent from a study of this disclosure and the appended claims.

According to the present invention, ethyl mercaptan and ethylene oxide are caused to interact in the presence of sodium hydroxide dissolved in methanol as a catalyst.

The following is an example of operation according to the invention.

*Example*

Ethyl mercaptan and catalyst (methyl alcohol and sodium hydroxide, or metallic sodium on soda ash) were added to a 1-liter heated stainless steel reactor. The reactor was closed and purged with nitrogen to remove the air. The stirring motor was started and the reactor heated to 160° F. Ethylene oxide was added slowly. Stirring was continued until the pressure came down to 10–20 p.s.i.g. The product was removed from the reactor and neutralized with sulfuric acid or $CO_2$. The sodium salt was then filtered from the product.

| Batch No | 1 | 2 | 3 | 4 | 5 | 6 | 7 | 8 |
|---|---|---|---|---|---|---|---|---|
| I. Charge Data: | | | | | | | | |
| Ethyl mercaptan, g | 434 | 434 | 434 | 434 | 434 | 434 | 434 | 434 |
| Ethylene oxide, g | 360 | 308 | 383 | 244 | 198 | 308 | 355 | 315 |
| Methyl alcohol, g | 50 | | | | 8 | | | 8 |
| Sodium hydroxide, g | 14 | 14 | 7 | | 10.0 | | | 7 |
| Metallic sodium (5 wt. %) g. on soda ash | | | | 3.5 | | 14 | 7 | |
| II. Reaction Data: | | | | | | | | |
| Time, hours | 4.25 | 3.00 | 1.00 | 0.67 | 3.50 | 1.41 | 4.17 | 1.41 |
| Temperature, °F | 180–200 | 160–210 | 170–210 | 160–240 | 200–260 | 200–260 | 200–210 | 200–270 |
| Pressure, p.s.i.g | 50–60 | 50–65 | 60–70 | 35–50 | 60–100 | 55–80 | 70–100 | 75–80 |
| III. Product Data: | | | | | | | | |
| Reactor product, g | 830 | 850 | 823 | | | | | |
| Neutralized with $CO_2$ to | | pH 5 | pH 9 | | | | | |
| Neutralized with $H_2SO_4$ to | pH 2 | | | pH 4 | pH 1 | pH 5 | pH 5 | pH 5 |
| ASTM Distillation, °F.: | | | | | | | | |
| Percent Condensed— | | | | | | | | |
| IBP | 165 | 245 | 225 | 187 | 145 | 204 | 167 | 199 |
| 5 | 186 | 347 | 335 | 335 | 191 | 343 | 202 | 337 |
| 10 | 216 | 361 | 349 | 344 | 307 | 350 | 252 | 352 |
| 20 | 336 | 369 | 360 | 348 | 352 | 352 | 345 | 356 |
| 30 | 355 | 374 | 365 | 349 | 354 | 354 | 352 | 358 |
| 40 | 362 | 380 | 369 | 352 | 355 | 356 | 356 | 359 |
| 50 | 363 | 087 | 375 | 354 | 355 | 360 | 359 | 361 |
| 60 | 372 | 416 | 405 | 357 | 356 | 364 | 393 | 363 |
| 70 | 1 392 | 436 | 428 | 361 | 356 | 368 | 410 | 366 |
| 80 | 429 | 461 | 448 | 366 | 357 | 409 | 418 | 373 |
| 90 | 472 | 540 | 477 | 413 | 358 | 450 | 434 | 409 |
| 95 | 540 | 558 | 539 | 428 | 366 | 469 | 450 | 458 |

[1] p-Dithiane boils at 392° F.

A composite was made of the 8 batches, and fractionated in a Vigreux column. The total volume of the composite was 4000 ml.

The distillation yielded 20 volume percent p-dithiane, 35 percent 2-ethylmercapto ethanol, 35 percent diethyl sulfide, 5 percent light material, and 5 percent heavy material.

ANALYSES OF p-DITHIANE

| | Observed | Theoretical |
|---|---|---|
| Total sulfur | 53.7 | 53.4 |
| M.P., °F | 227–230 | [1] 231 |
| Molecular Weight | 119.5 | 120 |
| Mercaptan Sulfur | 0.0 | 0.0 |

ANALYSES OF DIETHYL SULFIDE

| | | |
|---|---|---|
| Total Sulfur | 33.4 | 35.5 |
| Molecular Weight | 89.0 | 90 |
| Refractive index 20/D | 1.4408 | |
| B.P., °F | | [1] 197 |

[1] Value disclosed in literature.

ASTM DISTILLATION

| Percent | °F |
| --- | --- |
| IBP | 171 |
| 10 | 185 |
| 50 | 196 |
| 90 | 198 |

The conditions now preferred for the synthesis of the products of the invention, e.g., the p-dithiane and/or diethylsulfide, by the method of the invention are as follows:

Temperature range, °F _____ 130–350
Pressure range, p.s.i.g. _____ 30 to 150
Mole ratio ethylene oxide/ethyl mercaptan _____ 0.1/1.0 to 1.0/1.0
Catalyst wt. percent of reactants ___ 0.5 to 5.0

While this invention has been described in connection with the specific embodiment wherein sodium hydroxide dissolved in methanol as catalyst is employed, it is within the scope of the invention to use another alkali metal hydroxide catalyst such as potassium hydroxide and another low-boiling alcohol such as ethanol.

Reasonable variation and modification are possible within the scope of the foregoing disclosure and the appended claims to the invention, the essence of which is that it has been found that p-dithiane and/or diethyl sulfide are formed when ethyl mercaptan and ethylene oxide are caused to interact in the presence of an alkali metal hydroxide dissolved in a low-boiling alcohol as catalyst.

We claim:

1. A process for the preparation of a compound selected from the group consisting of p-dithiane and diethyl sulfide which comprises causing to interact ethyl mercaptan and ethylene oxide in the presence of an alkali metal hydroxide dissolved in methanol as catalyst at a temperature in the approximate range 130° F.–350° F., a pressure in the approximate range 30–150 p.s.i.g., the mol ratio of ethylene oxide to ethyl mercaptan being in the range 0.1/1–1/1 and the catalyst being present in an amount in the approximate range 0.5–5 weight percent of the reactants.

2. A process according to claim 1 wherein the ratio of the mercaptan and ethylene oxide reactants viewed as a whole to that of the catalyst is in the range of approximately 95:99.5.

3. A process for the formation of a compound selected from the group consisting of p-dithiane and diethyl sulfide which comprises causing to interact ethyl mercaptan and ethylene oxide in the presence of sodium hydroxide dissolved in methanol as a catalyst at a temperature in the approximate range 130° F.–350° F. by adding ethylene oxide to the ethyl mercaptan in a closed reactor at a pressure in the approximate range 30–150 p.s.i.g., the mol ratio of ethylene oxide to ethyl mercaptan being in the range 0.1/1–1/1 and the catalyst being present in an amount in the approximate range 0.5–5 weight percent of the reactants.

4. A process for the formation of a compound selected from the group consisting of p-dithiane and diethyl sulfide which comprises causing to interact methyl alcohol and sodium hydroxide with ethylene oxide and ethyl mercaptan in a closed reactor at a temperature in the approximate range 130° F.–350° F. at a pressure in the approximate range 30–150 p.s.i.g., the mol ratio of ethylene oxide to ethyl mercaptan being in the range 0.1/1–1/1 and the catalyst being present in an amount in the approximate range 0.5–5 weight percent of the reactants.

5. A process for the formation of a compound selected from the group consisting of p-dithiane and diethyl sulfide which comprises causing to interact in a closed vessel metallic sodium on soda ash and ethyl mercaptan while adding ethylene oxide to said vessel at a temperature in the approximate range 130° F.–350° F. at a pressure in the approximate range 30–150 p.s.i.g., the mol ratio of ethylene oxide to ethyl mercaptan being in the range 0.1/1–1/1 and the catalyst being present in an amount in the approximate range 0.5–5 weight percent of the reactants.

6. A process for the formation of a compound selected from the group consisting of p-dithiane and diethyl sulfide which comprises causing to interact ethyl mercaptan and ethylene oxide in the presence of sodium hydroxide dissolved in methanol in a reactor at a temperature in the approximate range 130° F.–350° F., a pressure in the approximate range 30–150 p.s.i.g., the mol ratio of ethylene oxide to ethyl mercaptan being in the range 0.1/1–1/1 and the catalyst being present in an amount in the approximate range 0.5–5 weight percent of the reactants.

7. A process for the formation of a compound selected from the group consisting of p-dithiane and diethyl sulfide which comprises bringing together ethyl mercaptan and ethylene oxide in the presence of sodium hydroxide dissolved in methanol as a catalyst and heating the mass to cause a desired extent of reaction to occur at a temperature in the approximate range 130° F.–350° F., a pressure in the approximate range 30–150 p.s.i.g., the mol ratio of ethylene oxide to ethyl mercaptan being in the range 0.1/1–1/1 and the catalyst being present in an amount in the approximate range 0.5–5 weight percent of the reactants.

8. A process for the formation of a compound selected from the group consisting of p-dithiane and diethyl sulfide which comprises adding ethylene oxide to ethyl mercaptan in a reaction zone in the presence of an alkali metal hydroxide dissolved in a low-boiling alcohol selected from the group consisting of ethanol and methanol as a catalyst at a temperature in the approximate range 130° F.–350° F., a pressure in the approximate range 30–150 p.s.i.g., the mol ratio of ethylene oxide to ethyl mercaptan being in the range 0.1/1–1/1 and the catalyst being present in an amount in the approximate range 0.5–5 weight percent of the reactants.

References Cited in the file of this patent

UNITED STATES PATENTS

| | | |
| --- | --- | --- |
| 2,494,610 | Davidson et al. | Jan. 17, 1950 |
| 2,776,997 | Doumani | Jan. 8, 1957 |
| 2,900,392 | Remes et al. | Aug. 18, 1959 |
| 2,976,323 | Folkins et al. | Mar. 21, 1961 |
| 3,030,426 | Mosely et al. | Apr. 17, 1962 |